INVENTOR
M. E. ALTERMAN
BY
R. C. Winter
ATTORNEY

United States Patent Office 3,238,311
Patented Mar. 1, 1966

3,238,311
SWITCHING SYSTEM TEST CIRCUIT

Michael E. Alterman, New Providence, N.J., assignor to Bell Telephone Laboratories, Incorporated, New York, N.Y., a corporation of New York Filed Nov. 19, 1962, Ser. No. 238,569
14 Claims. (Cl. 179—175.2)

Figure 1:
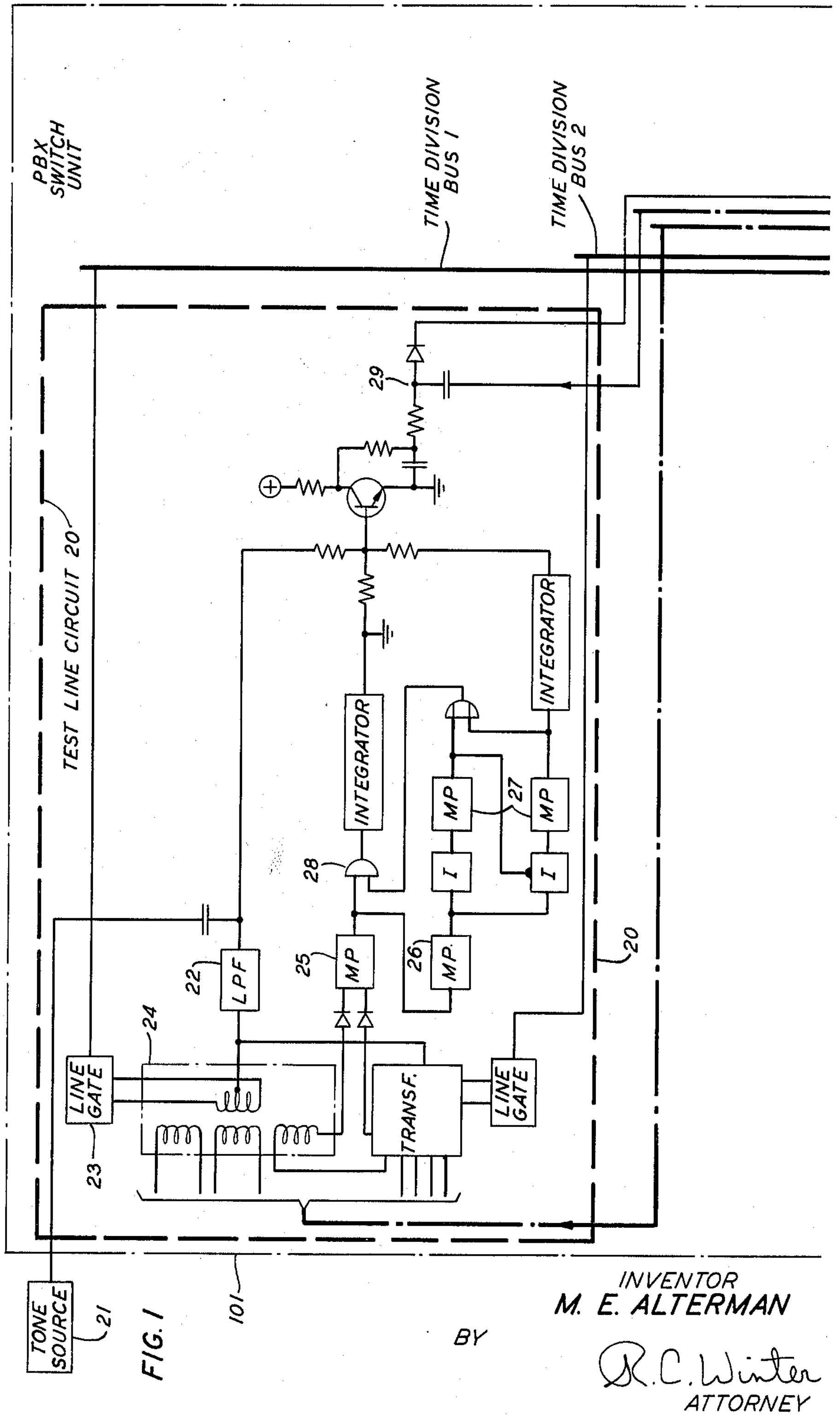

This invention relates to telephone switching systems and more particularly to test circuitry for automatic remote controlled telephone switching systems.

Recent technological advances, particularly in the electronics field, have permitted realization of telephone switching systems of considerably higher operating speed and reduced size than was possible heretofore. Such advancements have also led to virtually complete automation in such systems, and, recently, to control of a number of automatic systems from a remote common point.

In conventional telephone systems, groups of telephone lines terminate at a central office where operators or automatic equipment service and complete connections. A particular concentration of telephone lines in an area having a higher degree of interest among lines in the group, such as in a business office or factory, may be connected to the central office by a smaller group of trunks to handle calls to and from other lines in the system. Such installations are referred to as Private Branch Exchanges or PBX units and, in effect, comprise self-contained telephone switching systems with operators on hand to service the intraexchange calls as well as to complete connections via the trunks to and from the central office.

Latest developments in the PBX field, as exemplified by R. C. Gebhardt et al. patent application Serial No. 195,199, filed May 16, 1962, make such PBX units dependent for their control upon a remote control unit which is itself entirely automatic and may be located apart from the telephone central office. Attendants are still available at the PBX units but merely afford information services as required. The connection of telephone lines within the PBX or between the PBX and the central office is implemented by the control unit upon which the automatic switching equipment in each PBX is dependent.

Automation necessarily entails greater complexity in equipment utilized in such a system. Size reduction afforded by newly developed electronic components permits such greater complexity without entailing additional space requirements. For reliability purposes, considerable redundancy is required, again increasing the amount and complexity of necessary switching equipment. Furthermore, remote control demands superior maintenance facilities to assure that malfunctions are detected instantly and corrective steps taken.

Automatic equipment complexity tends to lead toward similar complexity in test equipment to realize this essential, superior, equipment performance, such that the facilities for assuring proper system performance may prove to be a major factor in establishing over-all system cost.

It is therefore an object of this invention to provide facilities for testing a remote controlled automatic telephone system which are simple, reliable and economical.

The test facilities essentially comprise two line circuits terminating on the remote controlled, PBX switch unit in a manner not unlike the connection of ordinary telephone lines. One of the test line circuits contains a signal source and a pulse detecting circuit. The other test line circuit contains merely an amplifier and signal detector.

The particular environment for describing the illustrative embodiment of this invention is considered in detail in the aforementioned Gebhardt et al. patent application. As disclosed therein, a PBX switch unit terminates all lines on a pair of communication buses, the use of which is time-divided or shared among the active pairs of lines connected through the switch unit. A record of all active connections is maintained at the switch unit, which record is continually up-dated by the remote control unit. The control unit also maintains a current record of the status of all connections through this and other switch units. The switch unit record serves to connect each active pair of lines in sequence to one of the time division buses in a repeated cycle at a speed sufficient to allow samples of each conversation to be transmitted between the lines of an active pair and to be reconstructed at the destination without loss of intelligence.

Interspersed with such connection of active pairs of lines is the selective connection of one or both test lines to the time division buses. The unique composition, routine of connection to the time division bus and manner of observation of the pair of test lines in accordance with my invention permit thorough and reliable testing of all major components of the switch unit including the time division bus, the line number memory, the common portions of the line number translation equipment, the line scanning facilities and the data transmission and receiving elements interconnecting the switch unit and common control unit. Thus, indications in the control unit that the switch unit has successfully connected the test lines to one of the time division buses, in accordance with a predetermined test routine, facilitate testing of all aspects of a time division switching system operation, including supervision, transmission, memory, control, crosstalk and noise, without compelling the monitoring of active connections through the network with complex test facilities, as required heretofore.

To make use of the test line circuits in testing a switch unit, the control unit periodically selects a time slot or sampling interval and signals the switch unit to connect the test line containing the signal detector and a nonexistent line to one of the time division buses in that time slot. If there is excessive noise or crosstalk on the bus, its presence will be detected by the test line changing its supervisory condition in the same manner as a regular telephone line changing from the idle to the busy condition, known as "off-hook." The switch unit recognizes the off-hook condition reported by the test line at this time and provides an appropriate signal to the control unit, the receipt of which indicates to the control unit that noise and crosstalk are beyond allowable limits at the switch unit. If the off-hook indication does not appear during an appropriate number of such tests, the noise and crosstalk will be presumed to be within allowable limits.

In the next phase of the test routine, the control unit instructs the switch unit to connect both test lines to the time division bus in the same time slot. If the switch unit is functioning properly, both test line circuits will report the off-hook condition, one because it is receiving the signal generated in the other, and the other because it is being connected to the bus in an acceptable manner. After receiving the off-hook signals from both test lines, the control unit advises the switch unit to disconnect the test lines. This should, of course, cause both test lines to appear to go on-hook, i.e., busy to idle, since the latter test line will no longer be connected to the bus and the former test line will no longer receive the signal generated by the latter.

The final phase of the routine ascertains receipt of ringing signal by connecting a line generating the ringing signal to the test line containing the signal source. The ringing signal, if properly received, will cause the test line to register the on-hook condition at this time.

Accordingly, it is a feature of my invention that a time division switching system include a pair of test line circuits which interact in response to signals applied by a remote control unit to indicate to the control unit the current condition of the various components comprising the switching system.

It is another feature of this invention that one of the test line circuits comprise a signal source and a pulse detecting circuit operative upon connection of the test line circuit to the time division bus to apply the signal to the bus and to indicate by a distinct supervisory indication whether the gate linking the test line circuit to the bus is being operated by pulses of a predetermined frequency and amplitude or a ringing signal is being received from the bus.

It is a further feature of this invention that the other test line circuit comprise a detector of any signal within a prescribed frequency band and amplitude range and be operative upon connection to the time division bus to provide a distinct supervisory indication in the presence of the prescribed signal on the bus.

More particularly, it is a feature of my invention that said other test line circuit be connected to a nonexistent line through the time division bus in a particular time slot and produce a change in supervisory state at this time in the presence of excessive noise or crosstalk on the bus.

It is still another feature of my invention that the two test line circuits be connected to the common bus simultaneously, provision of the prescribed supervisory indication from each of the test line circuits indicating satisfactory operation of the switching unit.

Figure 2:
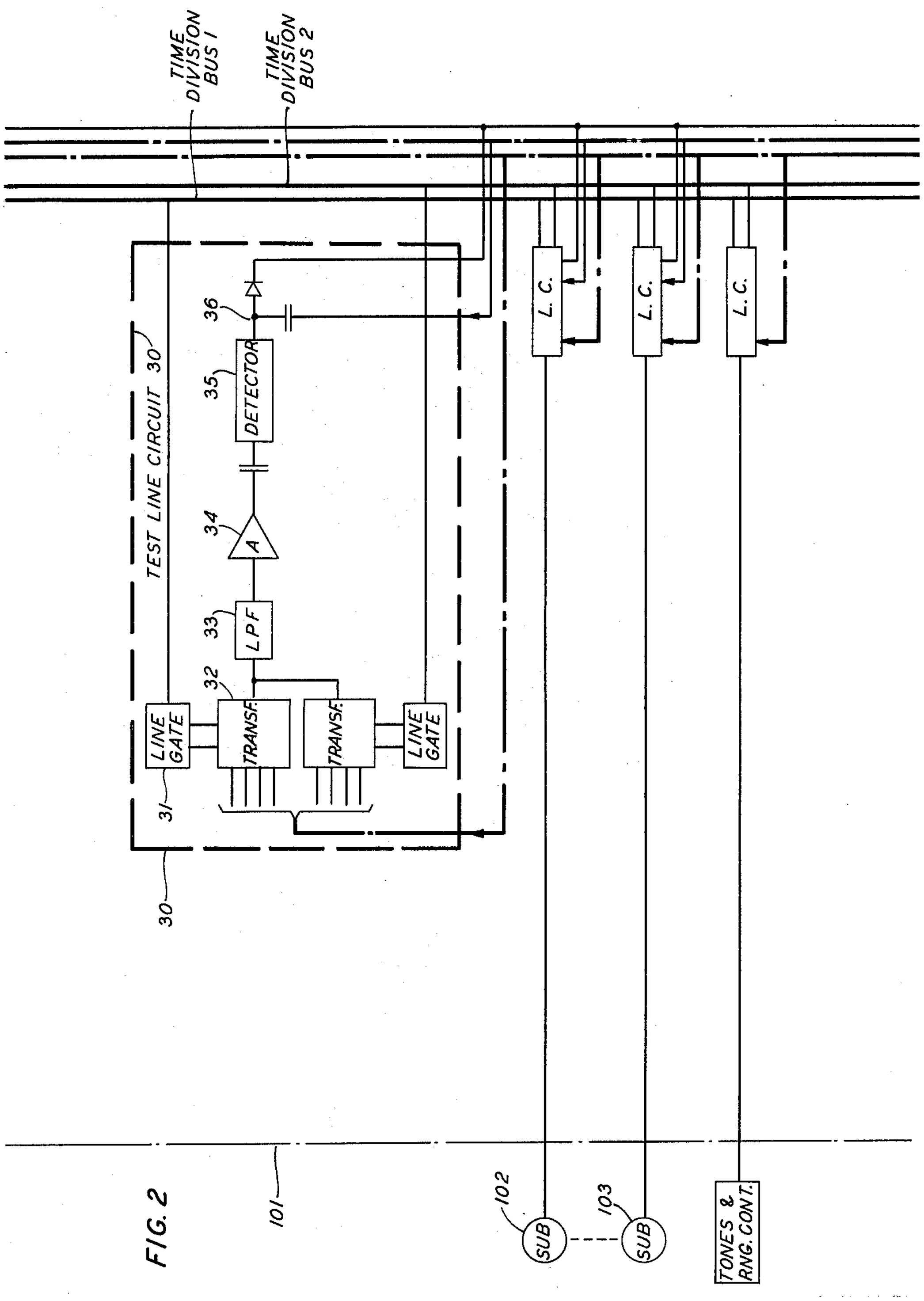
Figures 3, 4:
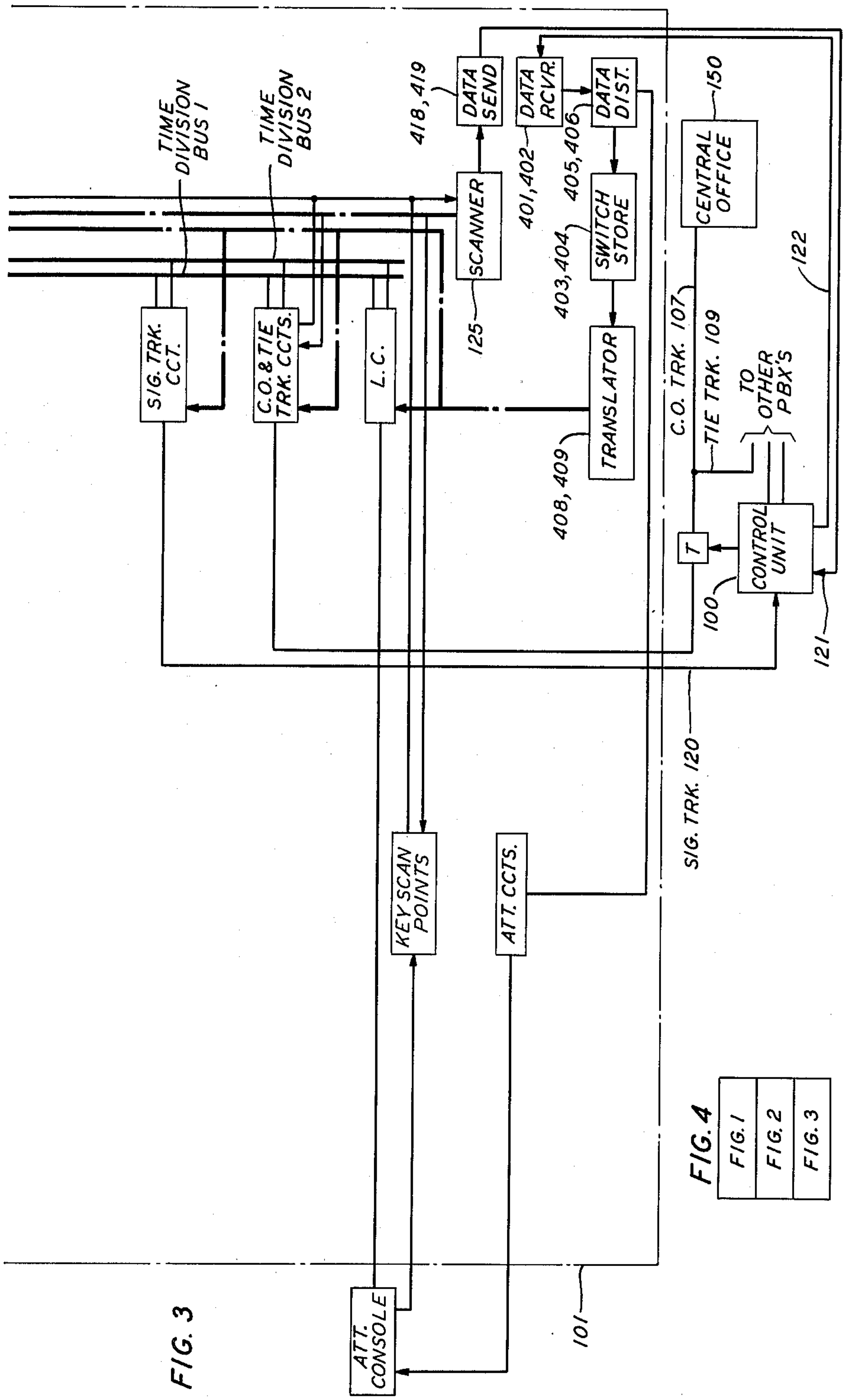

A complete understanding of this invention and of the above-noted and other features thereof may be gained from consideration of the following detailed description and the accompanying drawing, in which:

FIGS. 1, 2, and 3 are representations, mainly in block diagram form, of one specific illustrative embodiment of this invention; and FIG. 4 is a key chart of FIGS. 1, 2, and 3.

Referring now to the drawings, FIGS. 1, 2, and 3 depict a telephone system in which one embodiment of the invention may be illustrated. The system there depicted is fully described in the aforementioned Gebhardt et al. patent application, FIG. 1 thereof corresponding to the instant FIGS. 1, 2, and 3. Briefly, the system comprises a control unit 100, FIG. 3, serving a plurality of PBX switch units such as 101. Each PBX serves a plurality of subscriber lines or PBX extensions such as 102 and 103, FIG. 2, and is connected to a telephone central office 150, FIG. 3, via trunks such as 107. Each PBX switch unit also has the ability to communicate with other PBX units via tie trunks such as 109 and with the control unit 100 via signaling trunks such as 120 and data trunks 121 and 122.

The basic control operations for the system are performed in the control unit 100, which may be independent and remote from the PBX's and the central office 150. Each time one of the telephone lines associated with the PBX 101 changes its state, e.g., off-hook, on-hook, the PBX 101 informs the control unit 100 of the situation, and the control unit in turn revises its record of the system's status as it pertains to that particular telephone line. Having made this revision, the control unit 100 signals the PBX 101 to take further action with regard to this telephone line, e.g., connect it to the time division bus, disconnect it therefrom, apply various tones.

In this fashion control operations which are common to a number of PBX units may be performed by control equipment common to all of the units, and only those operations peculiar to each PBX operation are performed at the PBX switch unit. In addition to interconnecting lines via the bus, the latter operations comprise observing each telephone line to detect service transitions, translating such transitions into information which may be understood by the control unit 100, and transmitting such data to the control unit 100.

Similarly, data is received from the control unit 100 and stored in a memory at the PBX switch unit. As such stored information is required for the connection of the various active lines to the time division bus, it is removed from the memory and again translated and applied to the switching circuitry to effect such connections.

Thus it may be appreciated that although the majority of the control operations have been placed in a common control unit 100 remote from the various PBX switch units, a large number of complex electronic circuits and components are required in the switch unit itself.

It is expected that the operation of such PBX units would be substantially automatic, with an attendant being available at the PBX switch unit only for assistance in completing toll calls, providing information, et cetera. Thus the PBX switch unit itself does not include independent maintainance and test facilities but rather, in accordance with my invention, all of the requisite testing of the PBX equipment is accomplished with the available swithing equipment in conjunction with a pair of test line circuits 20 and 30, FIGS. 1 and 2, respectively, operated in response to signals from the control unit 100 in similar fashion to the completion of a normal call through the system.

The switch unit, as disclosed in the aforementioned Gebhardt et al. patent application, employs duplicate components including time division buses 1 and 2; data receivers 401, 402; switch stores 403, 404; data distributors 405, 406; translators 408, 409; and data send units 418, 419. For purposes of the instant disclosure, these duplicated components are utilized alternatively, and only the first designated one of each pair will be referred to hereinafter.

Before considering the details of each of the test line circuits, the manner of completing the connection of lines to the time division bus will be described briefly, the details of such connection being fully disclosed in the previously cited Gebhardt et al. patent application.

The common control unit 100 contains a record of the status of each call through the system, which record is examined and revised periodically. Information concerning a particular active connection is transmitted from the control unit 100 to the interested PBX switch unit at one point during the processing of a call connection. It is stored in the switch store 403 and interrogated during a discrete interval or time slot in a cycle of time slots. At each cyclic appearance of the assigned time slot, the information stored in the switch store 403 is utilized via translator 408 to enable the line gate circuits which serve to connect the desired pair of telephone lines simultaneously to the time division bus. Since all lines in the PBX are common to this time division bus, the pair of lines connected simultaneously thereto during the discrete time interval will be in direct, private communication with one another and will be permitted to interchange speech samples, et cetera.

When the status of the connection established in the assigned time slot is changed, the PBX switch unit so informs the remote control unit 100. Depending upon the nature of the change, the control unit 100 will conduct a sequence of actions leading to a revision of the information stored therein, upon completion of which the PBX unit will be informed of the new status of the call and ordered to revise the data in its memory.

Orientation of the control unit 100 toward such continuous monitoring of the status of calls through each PBX unit permits the inclusion of test routines for the entire PBX switch unit merely by arranging for periodic insertion in a time slot of information directed to connection of one or both of the test line circuits in a given PBX switch unit to the corresponding time division bus. The switch unit in turn will monitor the supervisory indications produced in the respective test line circuits by such interconnections and inform the control unit of the results just as it would inform the control unit of a change of state of any telephone line in the PBX. However, in this instance the control unit recognizes a particular change of state at a predetermined time during the test routine as evidence of a successful test. Absence of such an indication at the predetermined time will indicate to the control unit that a malfunction exists in the particular PBX switch unit under test, and appropriate steps will be taken to correct the condition. Thus, by proper programing of the test line circuit connections to the time division bus, the particular type of trouble and its location can be isolated during the test routine.

FIG. 1 depicts test line circuit 20 connected to a tone source 21 advantageously comprising a multivibrator, the output signal of which is applied to a low pass filter 22. The frequency of the multivibrator is not critical, the system requiring only that the resultant signal be in the voice frequency range above a prescribed amplitude so as to correspond to an indication of excessive noise or crosstalk in the network. The signal is capacitatively coupled to the filter 22 so that direct-current signal for ringing can be transmitted from the time division but to the scan point at which the network observes the supervisory state of the line circuit.

Each line circuit in the PBX switch unit is selectively connected to a time division bus by enabling a line gate such as gate 23 in the test line circuit 20. Application of an enabling signal to the line gate 23 from the translator 408, FIG. 3, which identifies the particular line to be sampled, serves to complete a path from the low pass filter 22 in the line circuit to time division bus 1. The enabling signal is coupled through transformer 24 from the translator 408 to the line gate 23.

In normal operation the line gates in each active line circuit are sampled in sequence during a repetitive sampling cycle in the PBX switch unit. If a line is sampled less often, a loss of transmission will result. If a line is sampled more than once during the sampling cycle, the line of course will be connected to the time division bus in more than one time slot, possibly producing crosstalk in the system. Thus one function of this test line circuit is to assure that the line gates are sampled once, and only once, in each sampling cycle.

For this purpose an additional winding on transformer 24 serves to apply the enabling signal to monopulser 25, as well as to line gate 23, preparatory to detecting errors in the application of the gate enabling pulse. The monopulser 25 generates a pulse each time the line gate is sampled. Its output activates monopulser 26, which in turn triggers monopulsers 27 on the trailing edge of the output pulse from monopulser 25 through corresponding inverter circuits. The outputs of monopulsers 25 and 27 are applied to coincidence gate 28.

Should an extra line gate enabling signal be received while either of the monopulsers 27 is active, coincidence gate 28 will be enabled. Similarly, if another line gate enabling signal is received after recovery of the monopulsers 27 but before termination of the current cycle of time slots, the latter will again be activated, and coincidence gate 28 will provide its output at the end of the sampling cycle when the next regular line gate enabling signal is applied to this test line circuit. Of course in the absence of the regular gate enabling signal, monopulser 25 will not be activated during the sampling cycle and coincidence gate 28 will receive like (no signal) inputs and again provide the output signal during the cycle.

The output of gate 28 is integrated and made available at the scan point 29 for the test line circuit. The PBX switch unit periodically examines the scan point in each line circuit to determine the supervisory condition of the line. It does so by applying a signal from scanner 125, FIG. 3, to the scan point for the corresponding line circuit. Return of the scan signal to the scanner 125 from a particular line circuit is indicative of an off-hook condition in that line. If the scan signal is blocked and fails to return to the scanner, the line circuit is presumed to be on-hook. Thus if gate 28 is enabled, passage of the scan signal is blocked at the scan point 29, thereby advising the scanner 125 that this test line circuit is on-hook. The control unit will recognize the on-hook indication, received from this test line circuit at this time, as indicating that the line gates are not being sampled properly. Since gate 28 cannot distinguish between multiple line gate operation and no line gate operation, the integrating circuit at the output of one monopulser 27 is included to provide the on-hook indication at the scan point 29 when the line gate is not activated at all during the sampling cycle.

If the gate control test produces an off-hook signal indicative of proper operation, the control unit will subsequently connect a direct-current ringing signal to the test line circuit 20. This signal is received via the time division bus through the line gate 23 and the low pass filter 22 at the scan point 29, causing the scan point 29 to change to the on-hook state. This test is not performed unless the results of the gate control test are acceptable. Thus the control unit is advised by the sequence of off-hook and on-hook indications that the line gate operation is proper and that ringing current is being received by the line circuits.

Test line circuit 30, FIG. 2, serves to detect signal present on the time division buses above a prescribed limit. The line gate 31 is enabled by a control signal applied by the PBX switch unit translator 408 through transformer 32. With line gate 31 enabled, any signal appearing on time division bus 1 will be applied through low pass filter 33 to amplifier 34.

The amplified signal is applied to detector 35 advantageously comprising an integrating circuit which produces an output signal at the line circuit scan point 36 if the signal received from the time division bus is above a prescribed limit. An output signal from the detector 35 permits passage of the scanning signal, thus producing an off-hook indication for transmission to the control unit. With the signal level on the time division bus below the prescribed limit, the scan signal will be blocked, and the condition reported to the control unit for test line circuit 30 will be the on-hook condition.

Employment of these two test line circuits in a prescribed test pattern will serve to detect any trouble condition existing in the automatic components of the PBX switch unit. The system organization requires that the PBX switch unit control the actual connection of lines to the time division bus. Since an active connection involves a pair of lines or a line and trunk, a pair of gate circuits is always activated simultaneously in each time slot to effect communication between the active lines. The control unit 100 initiates a test routine merely by advising the remote PBX switch unit to connect test line 30 to a non-existent line. Thus each time the time slot for this test connection occurs in the PBX cycle of time slots, only line gate 31, FIG. 2, of all line gates in the switch unit 101, will be enabled. Thereupon, the test for noise and crosstalk on the time division bus is effected If the results are positive, viz., noise and crosstalk within acceptable limits indicated by a continued on-hook condition, the control unit 100 will proceed to the second phase of the test routine, in which it requests the PBX switch unit 101 to interconnect test line circuits 20 and 30 in the same time slot.

An off-hook condition registered by test line circuit 30 at this time will indicate that the transmission path is established in that test line circuit 20 generates a tone which is above the level acceptable by the detector 35 in test line circuit 30. If test line circuit 30 indicates a continued on-hook condition at this time, the control unit will recognize this as a transmission problem existing in the time division bus. At the same time test line circuit 20 checks for operation of the line gates at the proper rate, and if it finds this rate is correct, it will so notify the control unit by changing to the off-hook condition.

With acknowledgment by both test line circuits 20 and 30 that the current tests have been performed without error, viz., an off-hook indication from both test line circuits, the control unit 100 will request the switch unit to disconnect both test lines. This should result in both lines appearing to go on-hook, since line gate 23 will no longer be sampled, and test line 30 will no longer receive the tone from source 21. Thereupon, the switch unit 101 is advised to activate appropriate line gates so as to apply a ringing signal to test line 20 over the time division bus. As indicated heretofore, if this ringing signal is received in test line circuit 20, its scan point will indicate the on-hook condition. Test line circuit 20 is so arranged that the direct-current ringing signal is passed directly to the scan point 29 and is capacitively isolated from the tone source 21.

The results of these successive tests are transmitted to the control unit by the supervisory circuit of the switch unit which detects changes in the status of each line. Since all the common equipment in the switch unit and the connecting links between the switch unit and the control unit are utilized in the establishment of these calls, the test routine is effective to detect trouble conditions in all of this equipment simultaneously with the testing of the time division bus.

It is to be understood that the above-described arrangements are illustrative of the application of the principles of my invention. Numerous other arrangements may be devised by those skilled in the art without departing from the spirit and scope of my invention.

What is claimed is:

1. In a communication system, a switching unit comprising a time division bus, a plurality of lines terminated in gates and having means for indicating the current state of said lines, means for selectively enabling said gates to interconnect pairs of said lines via said bus during discrete time intervals in a repetitive cycle, and means for testing the operability of the equipment in said communication system comprising control means remote from said switching unit for activating said gate enabling means to connect one of said lines to said bus and in response to receipt from said one line of a distinct supervisory indication of the current state of said one line to interconnect said one line and another one of said lines via said bus.

2. In a telephone system a plurality of Private Branch Exchange switch units each comprising a time division bus and a plurality of lines, each line being terminated in a gate and comprising supervisory status indicating means, a central office remote from said Private Branch Exchange units, a control unit independent of said central office and of said Private Branch Exchange units for directing the operation of each of said Private Branch Exchange units, and means for testing the operation of each of said Private Branch Exchange units comprising means in each unit for selectively enabling said gates to interconnect pairs of said lines via the corresponding one of said buses during discrete time intervals of a repetitive cycle, said control unit activating said enabling means in accordance with a predetermined test routine to connect a distinct pair of said lines to said corresponding bus in the same and discrete time intervals responsive to receipt of predetermined supervisory signals from said indicating means in said pair of lines at each step of the test routine.

3. A switching system comprising a time division bus, a plurality of lines terminated in gates and comprising indicating means, means connected to said indicating means for determining the current condition of each line, means for controlling establishment of interline connections in response to receipt of distinct supervisory indications, means for selectively enabling said gates to interconnect active pairs of said lines through said bus during discrete time intervals of a repetitive cycle, and means for testing the operability of the equipment in said switching system comprising a pair of said lines, said control means activating said enabling means to connect said pair of lines to said bus in a sequence determined by the supervisory signals provided by the indicating means in said pair of lines at each step in the sequence.

4. A switching system in accordance with claim 3 wherein one of said pair of lines comprises a gate enabling pulse detector for activating said indicating means to provide a distinct supervisory signal in response to erratic operation of the corresponding one of said line gates.

5. A switching system in accordance with claim 4 wherein said one of said pair of lines further comprises other means for activating said indicating means to provide said distinct supervisory signal in response to receipt of a ringing signal from said bus through said corresponding line gate.

6. A switching system in accordance with claim 5 wherein said one of said pair of lines further comprises means for generating a tone above a prescribed amplitude, and said other line comprises means for activating the coresponding indicating means to provide another supervisory signal in response to receipt through the corresponding line gate of a signal above said prescribed amplitude.

7. A switching system comprising a time division bus, a plurality of lines terminated in gates, means for selectively enabling said gates to interconnect pairs of said lines via said bus during discrete time intervals of a repetitive cycle, and means comprising said last-mentioned means for enabling the gates of first and second ones of said lines in accordance with a predetermined test routine to ascertain the operability of the equipment in said system, said first line comprising a signal source and a gate enabling pulse detector and said second line comprising a signal detector.

8. In a remote controlled switching system, a time division bus, a plurality of lines including first and second test lines terminated in line gates and including supervisory signal indicating means, means for selectively enabling said gates to connect pairs of lines to said bus in discrete time slots of a repetitive cycle of time slots, said first test line comprising a tone source and a gate enabling pulse detector for activating the corresponding supervisory signal indicating means to provide a distinct supervisory signal in response to erratic operation of the corresponding line gate, said distinct supervisory signal also being provided by said indicating means upon receipt of a ringing signal from said bus through the corresponding enabled line gate, said second test line comprising a signal detector for activating the corresponding supervisory signal indicating means to provide another distinct supervisory signal in response to receipt of a signal from said bus above a predetermined amplitude and within a frequency range including the signal generated by said tone source.

9. In a communication system, a switching unit comprising a time division bus, a plurality of lines terminated in gates, control means for determining the condition of each line and for selectively enabling said gates to interconnect pairs of said lines through said bus during discrete time intervals of a repetitive cycle, and means for ascertaining the ability of said system to transmit ringing signal to said lines comprising ringing signal generating means in one of said lines and means in another one of said lines for applying signal received through the corresponding line gate to a supervisory signal indicating means in said other line, means remote from said switching unit for activating said control means to enable said pair of lines simultaneously and means for transmitting the supervisory condition registered by said other line to said remote means.

10. A switching system comprising a time division bus, a plurality of lines each terminated in a gate and having means for indicating the condition of the corresponding line, means for selectively enabling said line gates to connect active pairs of said lines to said bus in discrete time slots of a repetitive cycle of time slots, said lines including a first test line comprising first means for activating the corresponding indicating means in one sense in response to erratic operation of the corresponding line gate and other means for activating said corresponding indicating means in the opposite sense in response to receipt of a distinct signal from said bus through said corresponding line gate.

11. A switching system in accordance with claim 10 wherein said first test line comprises a coincidence gate having its output connected to said corresponding indicating means and having a pair of inputs, means for activating one input in response to enablement of the first test line gate, and means for activating the other input concurrently with activation of the said one input in response to re-enablement of said first test line gate during said cycle of time slots.

12. A switching system in accordance with claim 10 wherein said first test line further comprises means for generating a signal in the noise and crosstalk range and further comprising a second test line having means for activating the corresponding indicating means in said one sense in response to receipt of signal from said bus in a range representative of noise and crosstalk upon activation of the corresponding line gate, and means for activating said line gate enabling means to connect said first and second test lines simultaneously to said bus, activation of the indicating means in said second test line in said one sense at this time manifesting proper transmission between an active pair of said lines.

13. A switching system in accordance with claim 12 wherein said first test line comprises capacitive means for coupling said signal generating means to said first test line gate to permit transmission of direct-current ringing signal from said bus through said first test line gate to said first test line indicating means.

14. In a time division switching system, a control unit, a Private Branch Exchange switching unit remote from said control unit, a control channel interconnecting said switching and control units, a plurality of lines including first and second test lines for reporting the condition of said Private Branch Exchange unit to said control unit, a time division bus at said Private Branch Exchange unit, gating means for interconnecting pairs of said lines in corresponding distinct time slots of a repetitive cycle via said bus, said first test line comprising means for detecting signal above a predetermined level and said second test line comprising a signal source and pulse detecting means, means at said control unit for activating said first test line and an unassigned one of said plurality of lines concurrently and thereafter for activating said first and second test lines concurrently, and means for reporting to the control unit each activation of said first and second test line detecting means.

References Cited by the Examiner

UNITED STATES PATENTS

| | | | |
|---|---|---|---|
| 2,955,165 | 10/1960 | Budlong et al. | 179—18 |
| 2,979,574 | 4/1961 | Lowry | 179—175.2 |
| 3,060,273 | 10/1962 | Nowak et al. | 179—175.2 |

ROBERT H. ROSE, *Primary Examiner.*